(12) United States Patent
Davydov

(10) Patent No.: US 8,871,151 B2
(45) Date of Patent: Oct. 28, 2014

(54) APPARATUS FOR MIXING TWO STREAMS OF CATALYST WITH AN INSERT HAVING ALIGNED OPENINGS

(75) Inventor: Lev Davydov, Northbrook, IL (US)

(73) Assignee: UOP LLC, Des Plaines, IL (US)

( * ) Notice: Subject to any disclaimer, the term of this patent is extended or adjusted under 35 U.S.C. 154(b) by 112 days.

(21) Appl. No.: 13/537,478

(22) Filed: Jun. 29, 2012

(65) Prior Publication Data

US 2014/0003187 A1 Jan. 2, 2014

(51) Int. Cl.
*F27B 15/08* (2006.01)

(52) U.S. Cl.
USPC ........................................................ 422/144

(58) Field of Classification Search
USPC ............. 366/176.1; 422/187, 144; 196/14.52; 208/113
See application file for complete search history.

(56) References Cited

U.S. PATENT DOCUMENTS

| | | | | |
|---|---|---|---|---|
| 2,365,293 | A | * | 12/1944 | Robinson .................... 366/173.1 |
| 4,309,308 | A | * | 1/1982 | Vickers ......................... 422/144 |
| 5,910,240 | A | * | 6/1999 | Senior et al. ................... 208/113 |
| 6,835,302 | B2 | | 12/2004 | Cammy et al. |
| 6,962,661 | B2 | * | 11/2005 | Northup et al. ............... 208/317 |
| 7,026,262 | B1 | | 4/2006 | Palmas et al. |
| 7,758,817 | B2 | | 7/2010 | Hedrick et al. |

FOREIGN PATENT DOCUMENTS

RU 2410155 C2 2/2011
WO 03083014 A1 10/2003

OTHER PUBLICATIONS

Search Report dated Sep. 5, 2013 for corresponding PCT Appl. No. PCT/US2013/039829, Davydov.

* cited by examiner

*Primary Examiner* — Tony G Soohoo
*Assistant Examiner* — Anshu Bhatia
(74) *Attorney, Agent, or Firm* — James C Paschall

(57) ABSTRACT

An apparatus for mixing streams of regenerated and carbonized catalyst utilizes bend provided on only one of the catalyst conduits to provide mixing advantages. A pair of horizontally aligned openings with a band between the pair of openings provided a robust design and superb catalyst mixing performance.

20 Claims, 3 Drawing Sheets

APPARATUS FOR MIXING TWO STREAMS OF CATALYST WITH AN INSERT HAVING ALIGNED OPENINGS

BACKGROUND OF THE INVENTION

The invention relates to an apparatus for mixing carbonized and regenerated catalyst. A field of the invention may be the field of fluid catalytic cracking (FCC).

FCC is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke are deposited on the catalyst to provide coked or carbonized catalyst. This carbonized catalyst is often referred to as spent catalyst. However, this term may be misconstrued because the carbonized catalyst still has significant catalytic activity. Vaporous products are separated from carbonized catalyst in a reactor vessel. Carbonized catalyst may be subjected to stripping over an inert gas such as steam to strip entrained hydrocarbonaceous gases from the carbonized catalyst. A high temperature regeneration with oxygen within a regeneration zone operation burns coke from the carbonized catalyst which may have been stripped.

Although the carbonized catalyst carries coke deposits it may still have activity. U.S. Pat. No. 3,888,762 discloses mixing carbonized and regenerated catalyst for contact with the hydrocarbon feed. The regenerated catalyst may be in the range of 593° to 760° C. (1100° to 1400° F.) and the carbonized catalyst may be in the range of 482° to 621° C. (900° to 1150° F.). U.S. Pat. No. 5,597,537 discloses mixing the carbonized and regenerated catalyst in a blending vessel to allow the regenerated and carbonized catalyst to reach a temperature equilibrium before contacting the hydrocarbon feed. U.S. Pat. No. 7,935,314 B2 discloses baffles in the riser to obstruct upward catalyst flow to foster mixing. A mixed catalyst with more uniform temperature avoids undesirable hot spots that can generate nonselective cracking to reduce the value of the product hydrocarbons.

Improved apparatus and processes are sought in the mixing of carbonized and regenerated catalyst.

SUMMARY OF THE INVENTION

We have found feeding a first catalyst stream downwardly to the riser while feeding a second catalyst stream horizontally to the riser fosters thorough mixing. However, we have also found that inserts with openings in the wall of the insert in the lower section of the riser can be subjected to destructive erosion especially for a smaller, perhaps third, arcuate section of a wall of the insert. Instead, we have found that eliminating the smaller arcuate section of the wall in favor of using a pair of openings in horizontal alignment can provide adequate mixing of catalyst streams while minimizing erosion. A band between the two openings enhances the horizontal movement of the second catalyst stream because the properly positioned ban can block horizontally traveling catalyst from directly entering the inner chamber of the insert.

In an apparatus embodiment, the present invention is an apparatus for mixing two streams of catalyst comprising a riser and a first catalyst conduit in communication with the riser. A second catalyst conduit is also in communication with the riser. An insert in the riser is in communication with the first catalyst conduit. A first pair of openings is in a wall of the insert. Lastly, openings in the first pair of openings are horizontally aligned.

In an additional apparatus embodiment, a first band is between the two openings.

In a further apparatus embodiment, a second pair of openings is in a wall of the insert. Openings in the second pair of openings are also horizontally aligned. Lastly, a width of the first pair of openings is the same as a width of the second pair of openings.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through an intermediate vessel.

The term "feeding" means that the feed passes from a conduit or vessel directly to an object without passing through an intermediate vessel.

The term "passing" includes "feeding" and means that the material passes from a conduit or vessel to an object.

The term "directing" means that the feed passes from a conduit or vessel which imparts a trajectory or a direction to the feed.

The term "upwardly relative to vertical" means that an angle is the smallest angle defined by an object and an imaginary vertical line.

The term "horizontal alignment" means an imaginary vertical line will intersect both objects and preferably will intersect a horizontal center of both objects.

The term "vertical alignment" means an imaginary horizontal line will intersect both objects and preferably will intersect a vertical center of both objects.

DETAILED DESCRIPTION OF THE INVENTION

The apparatus of the present invention is for mixing regenerated catalyst and carbonized catalyst for contact with a hydrocarbon feed. The present invention may be useful in any solids-gas contacting equipment. However, ready usefulness is found in an FCC unit.

Figure 1:
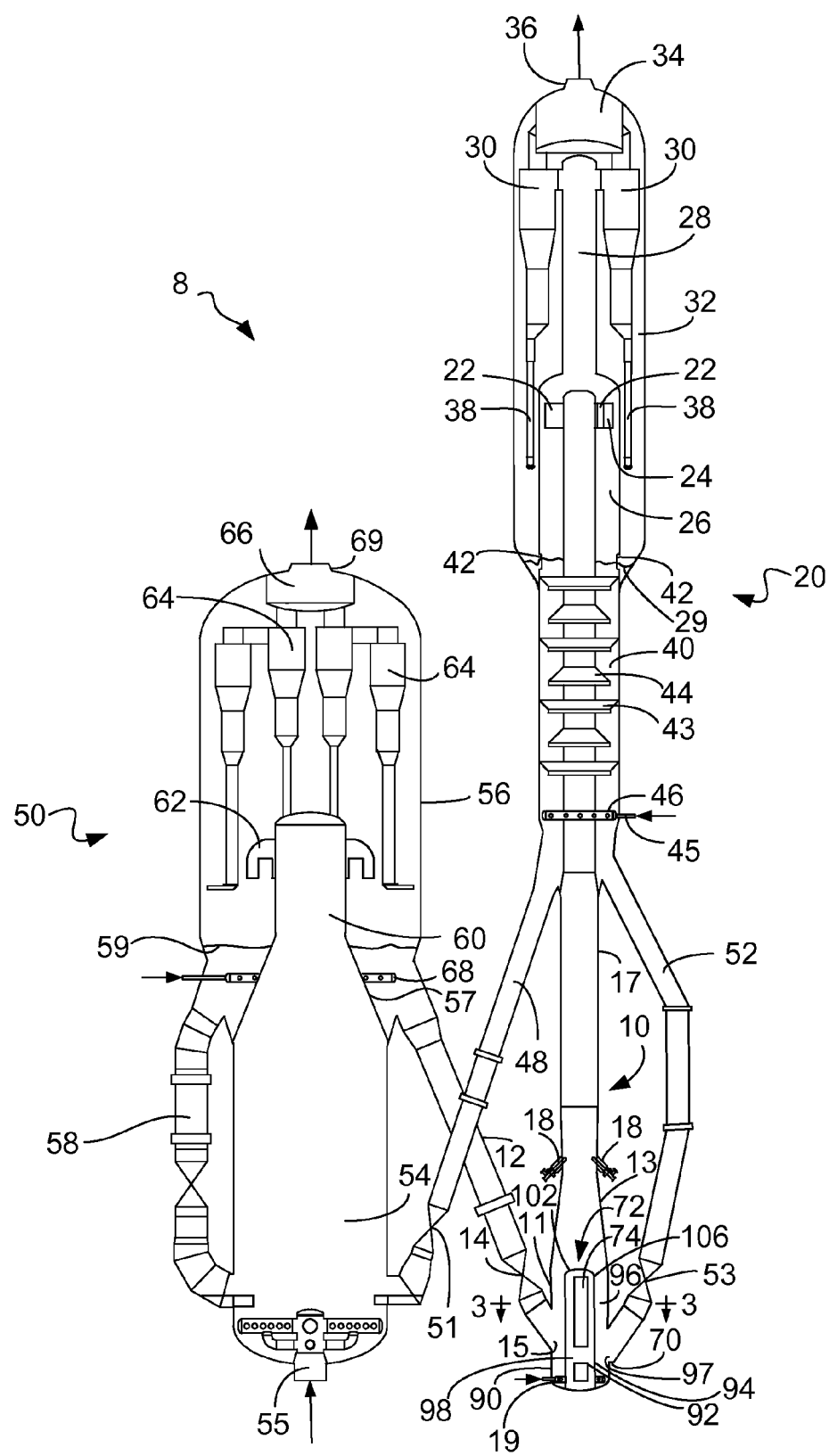
FIG. 1 is a schematic, elevational view of an FCC unit incorporating the present invention.

FIG. 1 shows an FCC unit 8 that includes a reactor vessel 20 and a regenerator vessel 50. A first regenerated catalyst conduit 12 transfers a first regenerated catalyst stream from the regenerator vessel 50 at a rate regulated by a control valve 14 through a regenerated catalyst inlet 15 of the first regenerated catalyst conduit 12 to the reactor riser 10. A second carbonized catalyst conduit 52 transfers a second carbonized catalyst stream from the reactor vessel 20 at a rate regulated by a control valve 53 through a carbonized catalyst inlet 97 of the second carbonized catalyst conduit 52 to the reactor riser 10.

The riser 10 is an elongated vertical tube typically made of killed carbon steel. The riser 10 may comprise an enlarged lower section 11 and a narrower upper section 17. The narrow upper section 17 may be made of chrome steel. The enlarged lower section 11 may have a larger diameter than the narrower upper section 17 of the riser. The enlarged lower section 11 may include a hemispherical bottom. The enlarged lower section 11 may include a frustoconical transition section 13 that tapers between the enlarged diameter of the enlarged lower section and the narrowed diameter of the upper section 17 of the riser. The first regenerated catalyst conduit 12 and a second carbonized catalyst conduit 52 may connect to the lower section 11 at a wall 90 of the lower section at inlets 15 and 97, respectively. The inner surface of the entire riser 10 may be coated with a refractory material.

A fluidization medium such as steam from a distributor 19 in the enlarged lower section 11 urges catalyst upwardly through the riser 10 at a relatively high density. A plurality of feed distributors 18 located in the upper section 17 of the riser 10 just above the transition section 13 inject feed across the flowing stream of catalyst particles to distribute hydrocarbon feed to the riser 10. Upon contacting the hydrocarbon feed with catalyst in the reactor riser 10 the heavier hydrocarbon feed cracks to produce lighter gaseous hydrocarbon product while coke is deposited on the catalyst particles to produce carbonized catalyst.

A conventional FCC feedstock and higher boiling hydrocarbon feedstock are suitable feeds. The most common of such conventional feedstocks is a "vacuum gas oil" (VGO), which is typically a hydrocarbon material having a boiling range of from 343° to 552° C. (650 to 1025° F.) prepared by vacuum fractionation of atmospheric residue. Such a fraction is generally low in coke precursors and heavy metal contamination which can serve to contaminate catalyst. Heavy hydrocarbon feedstocks to which this invention may be applied include heavy bottoms from crude oil, heavy bitumen crude oil, shale oil, tar sand extract, deasphalted residue, products from coal liquefaction, atmospheric and vacuum reduced crudes. Heavy feedstocks for this invention also include mixtures of the above hydrocarbons and the foregoing list is not comprehensive. It is also contemplated that lighter recycle or previously cracked feeds such as naphtha may be a suitable feedstock.

The reactor vessel 20 is in downstream communication with the riser 10. In the reactor vessel, the carbonized catalyst and the gaseous product are separated. The resulting mixture of gaseous product hydrocarbons and carbonized catalyst continues upwardly through the riser 10 into the reactor vessel 20 in which the carbonized catalyst and gaseous product are separated. A pair of disengaging arms 22 may tangentially and horizontally discharge the mixture of gas and catalyst from a top of the riser 10 through one or more outlet ports 24 (only one is shown) into a disengaging vessel 26 to effect partial separation of gases from the catalyst. Two, three or four disengaging arms 22 may be used depending on the size of the FCC unit.

A transport conduit 28 carries the hydrocarbon vapors, including stripped hydrocarbons, stripping media and entrained catalyst to one or more cyclones 30 in the reactor vessel 20 which separates carbonized catalyst from the product hydrocarbon gaseous stream. The disengaging vessel 26 is partially disposed in the reactor vessel 20 and can be considered part of the reactor vessel 20. A collection plenum 34 in the reactor vessel 20 gathers the separated hydrocarbon gaseous streams from the cyclones 30 for passage to an outlet nozzle 36 and eventually into a fractionation recovery zone (not shown). Diplegs 38 discharge catalyst from the cyclones 30 into a lower bed 29 in the reactor vessel 20. The catalyst with adsorbed or entrained hydrocarbons may eventually pass from the lower bed 29 into an optional stripping section 40 across ports 42 defined in a wall of the disengaging vessel 26. Catalyst separated in the disengaging vessel 26 may pass directly into the optional stripping section 40 via the bed 29. A fluidizing conduit 45 delivers inert fluidizing gas, typically steam, to the stripping section 40 through a fluidizing distributor 46. The stripping section 40 contains baffles 43, 44 or other equipment to promote contacting between a stripping gas and the catalyst. The stripped, carbonized catalyst leaves the stripping section 40 of the disengaging vessel 26 of the reactor vessel 20 with a lower concentration of entrained or adsorbed hydrocarbons than it had when it entered or if it had not been subjected to stripping. A first portion of the carbonized catalyst leaves the disengaging vessel 26 of the reactor vessel 20 through a spent catalyst conduit 48 and feeds into the regenerator vessel 50 at a rate regulated by a control valve 51. A second portion of the carbonized catalyst that has been coked in the reactor riser 10 leaves the disengaging vessel 26 of the reactor vessel 20 and is fed through the second carbonized catalyst conduit 52 back to the riser 10 at a rate regulated by a control valve 53. The second carbonized catalyst conduit 52 is in downstream communication with the reactor vessel 20. The second carbonized catalyst conduit 52 is in downstream communication with the outlet port 24 of the riser 10 and in upstream communication with a carbonized catalyst inlet 97 of the second carbonized catalyst conduit 52 to the riser 10.

The riser 10 of the FCC process is maintained at high temperature conditions which generally include a temperature above about 425° C. (797° F.). In an embodiment, the reaction zone is maintained at cracking conditions which include a temperature of from about 480° to about 621° C. (896° to 1150° F.) at the riser outlet port 24 and a pressure from about 69 to about 517 kPa (ga) (10 to 75 psig) but typically less than about 275 kPa (ga) (40 psig). The catalyst-to-oil ratio, based on the weight of catalyst and feed hydrocarbons entering the bottom of the riser, may range up to 30:1 but is typically between about 4:1 and about 10:1 and may range between 7:1 and 25:1. Hydrogen is not normally added to the riser, although hydrogen addition is known in the art. Steam may be passed into the riser 10 and reactor vessel 20 equivalent to about 2-35 wt-% of feed. Typically, however, the steam rate will be between about 2 and about 7 wt-% for maximum gasoline production and about 10 to about 20 wt-% for maximum light olefin production. The average residence time of catalyst in the riser may be less than about 5 seconds. The type of catalyst employed in the process may be chosen from a variety of commercially available catalysts. A catalyst comprising a zeolitic material such as Y zeolite is preferred, but the older style amorphous catalysts can be used if desired. Additionally, shape-selective additives such as ZSM-5 may be included in the catalyst composition to increase light olefin production.

The regenerator vessel 50 is in downstream communication with the reactor vessel 20. In the regenerator vessel 50, coke is combusted from the portion of carbonized catalyst delivered to the regenerator vessel 50 by contact with an oxygen-containing gas such as air to provide regenerated catalyst. The regenerator vessel 50 may be a combustor type of regenerator for completely regenerating carbonized catalyst. However, other regenerator vessels and other flow conditions may be suitable for the present invention. The spent catalyst conduit 48 feeds carbonized catalyst to a lower chamber 54. The carbonized catalyst from the reactor vessel 20 usually contains carbon in an amount of from 0.2 to 2 wt-%, which is present in the form of coke. An oxygen-containing combustion gas, typically air, enters the lower chamber 54 of the regenerator vessel 50 and is distributed by a distributor 55. As the combustion gas enters the lower chamber 54, it contacts carbonized catalyst entering from spent catalyst conduit 48 and lifts the catalyst. The oxygen in the combustion gas contacts the carbonized catalyst and combusts carbonaceous deposits from the catalyst to at least partially regenerate the catalyst and generate flue gas.

In an embodiment, to accelerate combustion of the coke in the lower chamber 54, hot regenerated catalyst from a dense catalyst bed 59 in an upper chamber 56 may be recirculated into the lower chamber 54 via an external recycle catalyst conduit 58. Mixing hot catalyst from the dense catalyst bed 59 with relatively cooler carbonized catalyst from the spent catalyst conduit 48 entering the lower chamber 54 raises the overall temperature of the catalyst and gas mixture in the lower chamber 54. The mixture of catalyst and combustion gas in the lower chamber 54 ascends through a frustoconical transition section to the transport, riser section 60 of the lower chamber 54.

The mixture of catalyst particles and flue gas is discharged from an upper portion of the riser section 60 into the upper chamber 56. Substantially completely regenerated catalyst may exit the top of the transport, riser section 60, but arrangements in which partially regenerated catalyst exits from the lower chamber 54 are also contemplated. Discharge is effected through a disengaging device 62 that separates a majority of the regenerated catalyst from the flue gas. Cyclones 64 further separate catalyst from ascending gas and deposits catalyst through dip legs into dense catalyst bed 59. Flue gas exits the cyclones 64 and collects in a plenum 66 for passage to an outlet nozzle 69 of regenerator vessel 50 and perhaps into a flue gas or power recovery system (not shown). A fluidizing conduit delivers fluidizing gas, typically air, to the dense catalyst bed 59 through a fluidizing distributor 68, so the catalyst will fluidly exit through the catalyst conduits 12 and 58.

The regenerator vessel 50 typically has a temperature of about 594 to about 732° C. (1100 to 1350° F.) in the lower chamber 54 and about 649 to about 760° C. (1200 to 1400° F.) in the upper chamber 56. The regenerated catalyst conduit 12 is in downstream communication with the regenerator vessel 50 and communicates with the riser 10. Regenerated catalyst from dense catalyst bed 59 is transported through regenerated catalyst conduit 12 from the regenerator vessel 50 back to the reactor riser 10 through the control valve 14 and catalyst inlet 15 where it again contacts feed as the FCC process continues. The carbonized catalyst in conduit 52 comprises a second stream of catalyst.

The first stream of regenerated catalyst and a second stream of carbonized catalyst fed into the riser 10 tend not to mix thoroughly before contacting the hydrocarbon feed. Accordingly, the feed can encounter catalyst at varying temperatures resulting in non-selective cracking over hotter catalyst to a product composition with relatively more undesirable products. To ensure mixing between the carbonized catalyst and the regenerated catalyst, an insert 92 may be installed in the lower end 11 of the riser 10 to facilitate catalyst mixing.

In an embodiment shown in FIG. 1, the first regenerated catalyst conduit 12 and the second carbonized catalyst conduit 52 connect to and are in communication with the riser 10. The first stream of regenerated catalyst in the first regenerated catalyst conduit 12 and the second stream of carbonized catalyst in the second carbonized catalyst conduit 52 are fed to the riser 10 and mixed together. One or both of the first regenerated catalyst conduit 12 and the second carbonized catalyst conduit 52 may tangentially connect to the enlarged lower section 11 of the riser 10 to impart an angular motion to catalyst discharged into the riser to promote mixing therein. Additionally, a ramp or bend 70 may be installed at the connection between the second carbonized catalyst conduit 52 and the enlarged lower section 11 of the riser 10 also to promote mixing in the enlarged lower section 11. After mixing, a mixture of the first stream of regenerated catalyst and the second stream of carbonized catalyst pass upwardly in the riser 10.

The riser may include the insert 92. In an aspect, the enlarged lower section 11 of the riser 10 may include the insert 92. In an aspect, the insert 92 is contained in the enlarged lower section 11 of the riser. The insert 92 may have an outer wall 94 that is spaced apart from an inner surface of the wall 90 of the enlarged lower section 11 of the riser 10. In an aspect, the insert 92 is radially centered in the enlarged lower section 11 of the riser 10. In other words, although not shown, the insert 92 has a central longitudinal axis aligned with a central longitudinal axis of the riser. In a further aspect, the outer wall 94 of the insert is a vertical wall.

The wall 94 of the insert 92 and the wall 90 of the riser define a space 96 therebetween. In an aspect, the insert 92 and the enlarged lower section 11 may each be tubular so that together they define an annular space 96 or annulus between the wall 94 of the insert 92 and the wall 90 of the enlarged lower section 11. In a further aspect, the insert 92 and the enlarged lower section 11 may each be cylindrical so that together they define a circular annular space 96 or annulus between the wall 94 of the insert 92 and the wall 90 of the enlarged lower section 11. The first regenerated catalyst conduit 12 and the second carbonized catalyst conduit 52 may communicate with the space 96, so the first regenerated catalyst conduit 12 feeds the first stream of regenerated catalyst to the space 96 and the second carbonized catalyst conduit 52 feeds the second stream of carbonized catalyst to the space 96. The catalyst in the space 96 is fluidized by fluidizing gas from fluidizing distributor 19.

The insert 92 includes a first pair of openings 72 to a chamber 74 inside the insert. The opening 72 may be spaced apart from the wall 90 of the riser 10. The opening 72 may serve as an entrance to an interior of the chamber 74. The chamber 74 may be in communication with the first regenerated catalyst conduit 12 and the second carbonized catalyst conduit 52, so at least a portion of the first stream of regenerated catalyst and at least a portion of the second stream of carbonized catalyst may pass from the space 96 into the chamber 74 through the opening 72 in the wall 94 of the insert 92.

The narrowed upper section 17 of the riser 10 is above the insert 92. A frustoconical transition section 13 of the riser may be between the enlarged section 11 and the narrowed section 17 to transition the larger diameter of the enlarged lower section 11 to the smaller diameter of the narrowed upper section 17. Consequently, the transition section 13 may transition the mixed stream of the first stream of regenerated catalyst and the second stream of carbonized catalyst from an enlarged lower section to a narrowed upper section as the mixed stream of catalyst is passed up the riser. In an aspect, the insert 92 does not extend into the transition section 13, so the transitioning occurs after the mixed stream of catalyst is passed above the insert 92. Feed distributors 18 are typically disposed in the narrowed upper section 17 of the riser 10 above the enlarged lower section 11, the transition section 13 and the insert 92. Consequently, the feed is injected into the ascending catalyst stream that is thoroughly mixed together.

It is anticipated that the insert 92 be made of stainless steel such as 300 Series stainless steel and be lined with refractory. Additionally, the insert 92 may be made of or coated with a ceramic or other material that resists erosion.

Figure 2:
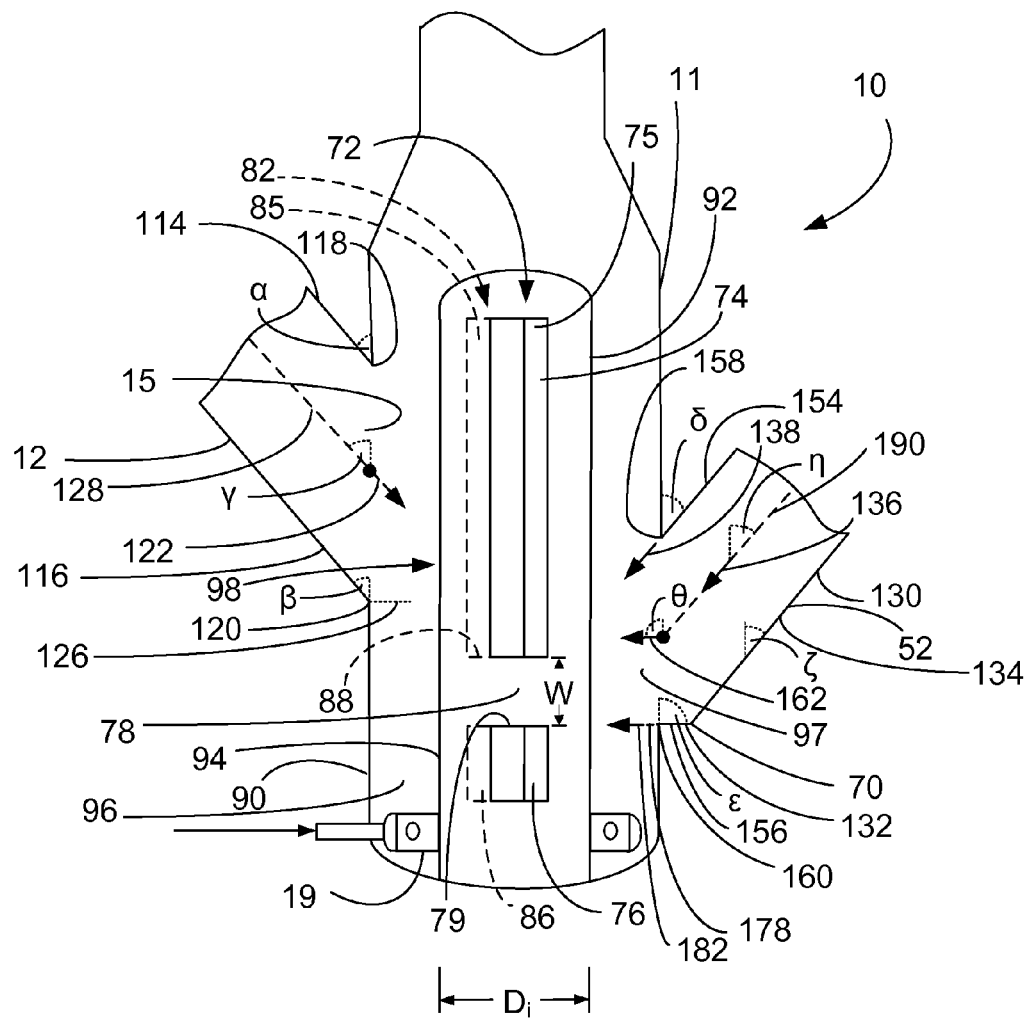
FIG. 2 is an enlarged, partial, elevational view of FIG. 1.

FIG. 2 is an enlarged partial view of FIG. 1. The first catalyst conduit 12 is in upstream communication with the riser 10 and defines the first catalyst inlet 15 with the riser. The first catalyst conduit 12 has a first top 114 which intersects the riser at the first inlet 15 at a first top intersection 118 and a first bottom 116 which intersect the riser at the first inlet 15 at a first bottom intersection 120. The first top 114 intersects the riser 10, in an aspect, the enlarged lower section 11 of the riser, defining a first top angle $\alpha$, upwardly relative to vertical at the first top intersection 118, and the first bottom 116 intersects the riser 10, in an aspect, the enlarged lower section 11 of the riser, defining a first bottom angle $\beta$, upwardly relative to vertical at the first bottom intersection 120. In an aspect, the first catalyst conduit 12 may be in direct and downstream communication with the regenerator vessel 50 and may therefore be termed the first regenerated catalyst conduit for carrying a hot first regenerated catalyst stream. It is also contemplated that the first catalyst conduit 12 may be in downstream communication with the outlet port 24 (FIG. 1) of the riser 10 and in which case may be termed the first carbonized catalyst conduit. In an aspect, the first top angle $\alpha$ and the first bottom angle $\beta$ may be equal to provide a parallel first top 114 and first bottom 116.

The first catalyst conduit 12 feeds a first stream of catalyst to the riser 10 in a first trajectory 122 imparted by the interior contour of the first top 114 and the first bottom 116 at the first inlet 15. In an aspect, a general first trajectory of the first catalyst stream will follow a central longitudinal axis 128 through the first catalyst conduit 12 along the first trajectory 122. The trajectory 122 defines a first angle $\gamma$ upwardly relative to vertical. The first trajectory 122 has a downward vertical component. In an aspect, the first trajectory angle $\gamma$ is equal to the first top angle $\alpha$ and the first bottom angle $\beta$. In a further aspect, the first trajectory angle $\gamma$ is less than about 60 degrees. The first stream of catalyst enters the riser through the first catalyst inlet 15 at a first lowermost elevation 126 of the first bottom intersection 120.

The second catalyst conduit 52 is in upstream communication with the riser 10 and defines the second catalyst inlet 97 with the riser. In an aspect, the second catalyst inlet 97 is in the enlarged lower section 11 of the riser. The second catalyst conduit 52 has a second top 154 which intersects the riser at the second inlet 97 at a second top intersection 158 and a second bottom 156 which intersect the riser at the second inlet 97 at a second bottom intersection 160. The second top 154 intersects the riser 10, in an aspect, the enlarged lower section 11 of the riser, defining a second top angle $\delta$, upwardly relative to vertical at the second top intersection 158, and the second bottom 156 intersects the riser 10, in an aspect, the enlarged lower section 11 of the riser, defining a second bottom angle $\epsilon$, upwardly relative to vertical at the second bottom intersection 160. In an aspect, the second top angle $\delta$ and the first top angle $\alpha$ and the first bottom angle $\beta$ may be equal. In a further aspect, the second bottom angle $\epsilon$ may be greater than the second top angle $\delta$ of the second catalyst conduit 52. Accordingly, the second bottom angle $\epsilon$ may be greater than the first top angle $\alpha$ and the first bottom angle $\beta$ of the first catalyst conduit 12.

In a further aspect, the second catalyst conduit 52 may be in downstream communication with the outlet port 24 (FIG. 1) of the riser 10 and in which case may be termed the second carbonized catalyst conduit for carrying a second carbonized catalyst stream. In this case, the first stream of catalyst will be hotter than the second stream of catalyst. In the alternative, it is also contemplated that the second catalyst conduit 52 may be in direct and downstream communication with the regenerator vessel 50 and may therefore be termed the second regenerated catalyst conduit for carrying a hot second regenerated catalyst stream.

In an aspect, the second catalyst conduit 52 defines the bend 70 in the second catalyst conduit 52. The bend 70 may be disposed outwardly of the second inlet 97. The bend 70 is flanked by an upper segment 130 and a lower segment 132 of the second catalyst conduit 52. An upper bottom 134 of the upper segment 130 upstream of the bend 70 defines an upper bottom angle $\zeta$ upwardly relative to vertical. The second bottom 156 is of the lower segment 132 downstream of the bend. The second bottom 156 defines the second bottom angle $\epsilon$ upwardly relative to vertical to be greater than the upper bottom angle $\zeta$. The bend 70 is provided by a mitered joint between the upper segment 130 and the lower segment 132 of the second catalyst conduit 52. The upper bottom angle $\zeta$ may be equal to the second top angle $\delta$. Consequently, the upper segment 130 of the second catalyst conduit 52 directs all of the second catalyst stream at an upper trajectory 136 defining an upper trajectory angle $\eta$ upwardly relative to vertical. The upper trajectory 136 is shown by an arrow along a central axis longitudinal axis 190 in the upper segment 130 of the second catalyst conduit 52.

The second bottom 156 of the lower segment 132 of the second catalyst conduit 52 intersects the riser 10, in an aspect, the enlarged lower section 11 of the riser, at the second bottom intersection 160 defining the second bottom angle $\epsilon$ which is greater than the upper bottom angle $\zeta$ defined by the upper segment 130. The bend 70 provides the second bottom 156 which defines the second bottom angle $\epsilon$ at the second bottom intersection 160 with the riser 10. The second bottom 156 of the second catalyst conduit 52 directs a portion of the second stream of catalyst to the riser 10 at a second bottom trajectory 182 at the second bottom angle $\epsilon$ imparted by the interior contour of the second bottom 156 at the second bottom intersection 160. The second bottom trajectory 182 is shown by an arrow from the second bottom intersection 160. The second top 154 of the second catalyst conduit 52 directs another portion of the second stream of catalyst to the riser at a second top trajectory 138 at the second top angle $\delta$ imparted by the interior contour of the second top 154 at the second top intersection 158. The second top angle $\delta$ may be the same as the upper trajectory angle $\eta$ of the upper trajectory 136 but different from the second bottom angle $\epsilon$. The second top trajectory 138 is shown by an arrow from the second top intersection 158. The second bottom 156, defining the second bottom angle $\epsilon$ at the second bottom intersection 160 with the riser 10 which may be greater than the second top angle $\delta$ will influence the entire second catalyst stream entering into the riser 10 to have a composite, second trajectory 162 defining the second trajectory angle $\theta$ which will be greater than the upper trajectory angle $\eta$. The second trajectory 162 is shown by an arrow from a second midpoint between the second top intersection 158 and the second bottom intersection 160.

The second stream of catalyst enters the riser through the second catalyst inlet 97 at a second lowermost elevation 178 of the second bottom intersection 160. In an aspect, the second bottom intersection 160 is at a lower elevation than first bottom intersection 120. Consequently, the second stream of catalyst will enter the riser at a second lowermost elevation 178 that is lower than the first lowermost elevation 126.

In an aspect, the general second trajectory of the second catalyst stream follows a second central longitudinal axis 190 through the second catalyst conduit 52 along the upper trajectory 136 with the upper trajectory angle η having a substantial downwardly vertical component. At the bend 70, the second bottom 156 will impart a more horizontal component to the general second trajectory which will take on the second trajectory 162 at the second trajectory angle θ from the midpoint of the second catalyst inlet 97.

In an aspect, the second bottom angle ε and the second trajectory angle θ is greater than or equal to about 60 degrees. Preferably, the angle ε is about 90 degrees. In an aspect, angles α, β, γ, δ, ζ, and η are all less than about 60 degrees, suitably between about 25 and about 50 degrees and preferably between about 30 and 45 degrees. In an aspect, the second trajectory angle θ may be less than or equal to the second bottom angle ε and may be greater than the second top angle δ of the second catalyst conduit 52. Moreover, the second trajectory angle θ may be greater than the first trajectory angle γ.

It is also contemplated that a ramp may be installed in the conduit to provide the same interior geometry as shown in FIG. 2 but with exterior geometry more similar to the first catalyst conduit 12.

The insert 92 in the riser 10 may be disposed between the first catalyst conduit 12 and the second catalyst conduit 52. In an embodiment, the insert 92 may be interposed between the first catalyst inlet 15 and the second catalyst inlet 97. The insert 92 may have the first pair 72 of openings 75, 76 in an outer wall 94 of the insert to allow entry of catalyst into a chamber 74 defined within the wall 94. In an aspect, the insert 92 may also have a second pair 82 of openings 85, 86 in an outer wall 94 on another side of the insert, shown partially in phantom, to allow entry of catalyst into a chamber 74.

In an aspect, an upper most portion of the first top opening 75 or the second top opening 85 may be at an elevation above the second bottom intersection 160, and preferably the second top intersection 158, of the second catalyst inlet 97. In a further aspect, an upper most portion of the first top opening 75 or the second top opening 85 may be at an elevation above the first bottom intersection 120, and preferably the first top intersection 118 of the first catalyst inlet 15. Hence, the first stream of catalyst may pass from the inlet 15 of the first catalyst conduit 12, and the second stream of carbonized catalyst may pass from the inlet 97 of the second catalyst conduit 52 at least partially upwardly through the first top opening 75 or the second top opening 85 into the chamber 74 through the space 96 between the wall 90 of the riser 10 and the wall 94 of the insert 92.

Consequently, the first stream of catalyst may pass through and/or around the insert 92 to mix with the second stream of catalyst, and the second stream of catalyst may pass through and/or around the insert 92 to mix with the first stream of catalyst. The first stream of catalyst and the second stream of catalyst may be fed to riser either tangentially or radially. A refractory lining will coat the riser 10 and the conduits 12 and 52, so the intersections and angles that govern the trajectory of the catalyst streams into the riser will be based on the contour interior surface of the riser 10 and conduits 12 and 52 and the lining thereon.

The second trajectory 162 has a second trajectory angle θ that is greater than the upper trajectory angle η and the first trajectory angle γ, so the second catalyst stream entering the riser 10 will have a significant horizontal component. This horizontal component of the second catalyst stream operates in conjunction with the fluidizing gas from the gas distributor 19 to direct a significant portion of the second catalyst stream up the riser more quickly after entering the riser 10. Moreover, the second catalyst stream will ascend to mix with the descending first catalyst stream entering the riser 10 at a higher elevation and having a substantial, downwardly vertical component. The ascending catalyst stream assisted by the ascending fluidizing gas will sweep up the descending first catalyst stream to provide for thorough mixing. The mixed stream of the first stream of catalyst and the second stream of catalyst pass up the riser to be contacted with hydrocarbon feed as described with respect to FIG. 1.

The configuration depicted in the FIGS. forces the second stream of catalyst from the lower second catalyst conduit 52 to enter the mixing vessel with a trajectory 162 that is almost horizontal. The upper first catalyst conduit 12 directs the first catalyst stream downwardly, so it enters the vessel almost vertically. This arrangement helps minimize the radial or tangential encounters of the two catalyst streams since the regions where the two catalyst streams enter the riser 10 are related vertically to each other. When axial or vertical mixing of the first catalyst stream and the second catalyst stream is dominant, the temperature differential in the cross-section is minimized. The second catalyst stream exiting the second catalyst conduit at a substantially horizontal trajectory will impinge on the opposing edges of wall 94 of the insert 92 defining the first pair 72 of openings and/or the second pair 82 of openings. This would be expected to lead to enhanced erosion of the wall 94. If the wall 94 of the insert has three arcuate sections that define three horizontally adjacent openings, a thinner arcuate section will likely erode the most. Computational Fluid Dynamics (CFD) modeling results suggest that simply increasing the width of the third arcuate section degrades the degree of mixing between first and second catalyst streams.

According to the invention, the first top opening 75 may be above and horizontally aligned with a first bottom opening 76 in the first pair of openings 72. In an aspect, the second top opening 85 may be above and horizontally aligned with a second bottom opening 86 in the lo second pair of openings 82.

It is preferred that the two pairs 72, 82 of openings have the same width. It is also preferred that the first top opening 75, the first bottom opening 76, the second top opening 85 and the second bottom opening 86 all have the same width. The first top opening 75 may have a greater height than the first bottom opening 76. The second top opening 85 may have a greater height than the second bottom opening 86.

A first band 78 between the first top opening 75 and the first bottom opening 76 in the first pair 72 of openings helps improve the mixing of the first stream of catalyst and the second stream of catalyst. The first band 78 blocks preferential horizontal movement of particles coming out of the second catalyst conduit 52 from the bend 70 from entry into the chamber 74 causing axial movement. This has been confirmed with CFD modeling which exhibits the presence of down flowing streamlines on the side of the second catalyst conduit 52 in the lower section 11 of the riser 10. This arrangement allows both first and second catalyst streams to occupy the entire space 96 between the insert 92 and the wall 90 of the riser at two different levels above and below the first band 78. After entry of the catalyst streams mixing occurs only in the vertical or axial direction. This minimizes radial or tangential variance of catalyst temperature when the catalyst gets into contact with hydrocarbon feed downstream of the enlarged lower section 11 of the riser 10. At the same time, by preventing catalyst particles from entering into the insert 92 horizontally the first band 78 minimizes the radial velocities of particles thus minimizing erosion of the edges of the wall of the openings 72 of the insert 92. In an aspect, a second band 88 may be provided between the second top opening 85 and the second bottom opening 86 in the second pair of openings 82 to further improve the mixing of the first stream of catalyst and the second stream of catalyst. Only the top edge of the band 88 is shown in phantom in FIG. 2.

The lower edge 79 of the first band 78 is vertically aligned with the second lowermost elevation 178 of the second bottom intersection 160. Accordingly, the bulk of horizontally traveling catalyst in the second catalyst stream from the second catalyst inlet 97 will impact the band 78 instead of the edges of the openings 80 and 82. A lower edge of the second band 88 may be also vertically aligned with the second lowermost elevation 178 of the second bottom intersection 160. In an aspect, the first band 78 and/or the second band 88 may have a width W that is about 0.3 to 0.7 of the diameter $D_i$ of the insert 92.

Figure 3:
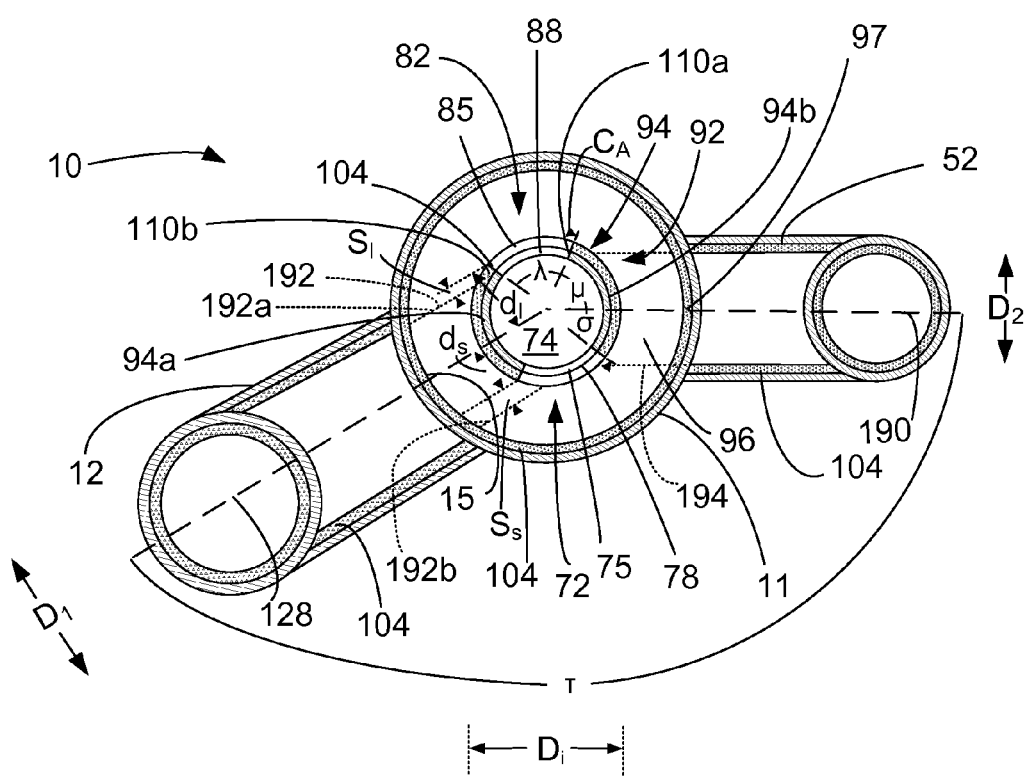
FIG. 3 is a sectional view of FIG. 1 taken at segment 3-3.

FIG. 3 shows a plan sectional view of segment 3-3 taken in FIG. 1. Refractory lining 104 on the wall 94 of the insert 92 and the wall of the lower section 11 of the riser 10, the first regenerated catalyst conduit 12 and the second carbonized catalyst conduit 52 is shown in FIG. 3. The first regenerated catalyst conduit 12 and the second carbonized catalyst conduit 52 define a 150 degree angle τ but other angles such as between about 100 and about 180 degrees may be suitable. The openings in both pairs 72, 82 of openings are horizontally aligned. The wall 94 of the insert 92 comprises two arcuate sections 94a and 94b that define the two pairs 72 and 82 of openings. Only a top opening 75, 85 in each pair of openings 72 and 82 is shown. The openings in both pairs 72, 82 of openings are horizontally aligned. A top edge of the band 78 that separates the first pair 72 of openings, and a top edge of the band 88 that separates the second pair 82 of openings are shown in FIG. 3. It is preferred that the two pairs 72, 82 of openings have the same width.

A first arcuate section 94a opposes the nearest catalyst conduit which may be the first regenerated catalyst conduit 12 and particularly the first catalyst inlet 15 thereof. A second arcuate section 94b also opposes the nearest catalyst conduit which may be the second carbonized catalyst conduit 12 and particularly the second catalyst inlet 97 thereof. Dashed lines show the first central longitudinal axis 128 of the first regenerated catalyst conduit 12 into the riser 10 and second central longitudinal axis 190 of the second carbonized catalyst conduit 52 into the riser. The first and second pairs 72, 82 of openings are not intersected by a longitudinal axis 128, 190 of a nearest one of the first regenerated catalyst conduit 12 and the second carbonized catalyst conduit 52 into the riser 10. In other words, the first catalyst inlet 15 and the second catalyst inlet 97 are azimuthal to a nearest one of the first and second pairs 72, 82 of openings, respectively. The first arcuate section 94a of the wall 94 is intersected by a central longitudinal axis 128 of a nearest one of said first catalyst conduit 12 and the second catalyst conduit 52 into the riser 10. The second arcuate section 94b of the wall 94 is intersected by a central longitudinal axis 190 of a nearest one of said first catalyst conduit 12 and said second catalyst conduit 52 into the riser 10.

The first stream of regenerated catalyst is passed from the first regenerated catalyst inlet 15 around the arcuate section 94a of the wall 94 of the insert 92 in the riser 10 to mix with the second stream of carbonized catalyst from the second carbonized catalyst inlet 97, and the second stream of carbonized catalyst is passed from the second carbonized catalyst inlet 97 around the arcuate section 94b of the wall 94 of the insert 92 in the riser 10 to mix with the first stream of regenerated catalyst from the first regenerated catalyst inlet 15. Additionally, the first stream of catalyst may pass through the first pair 72 openings and the second pair 82 of openings into the chamber 74 in the insert 92 to mix with the second stream of catalyst and the second stream of catalyst may pass through the first pair of openings 72 and the second pair 82 of openings into the chamber 74 to mix with first stream of catalyst.

A projection 192 of the first catalyst conduit 12 into the riser 10 at the first catalyst inlet 15 is shown in FIG. 3 in dotted lines. The projection 192 is defined by the inner surface of the refractory 104 inside the first catalyst conduit 12. The projection 192 extends into the first pair 72 of openings including the first top opening 75 in on a first side of the projection but does not extend into the second pair 82 of openings including the second top opening 85 on a second side of the projection 192. A projection 194 of the second catalyst conduit 52 into the riser 10 at the second catalyst inlet 97 is shown in FIG. 3 in dotted lines. The projection 194 is defined by the inner surface of the refractory 104 inside the second catalyst conduit 52. The projection 194 extends into the first pair 72 of openings including the first top opening 75 on a first side of the projection but does not extend into the second pair 82 of openings including the second top opening 85 on a second side of the projection. This arrangement assures better mixing of the first catalyst stream and the second catalyst stream.

A side 192a of the projection 192 is short of an imaginary line intersecting a nearest edge of the arcuate section 94a of the outer wall 94 of the insert 92 that is parallel to the side of the projection by a spacing $S_1$ of about 0.06 to about 0.10 of the inner diameter $D_1$ of the first catalyst conduit 12. An opposite side 192b of the projection 192 is overlapped by an imaginary line intersecting a nearest edge of the arcuate section 94a of the outer wall 94 of the insert 92 that is parallel to the side of the projection by a spacing $S_s$ by about 0.08 to about 0.12 of the diameter $D_1$ of the first catalyst conduit 12. In an embodiment, the distance between the longitudinal axis 128 and an upper edge of the arcuate section 94a corresponding to the side 192a of the projection 192 may be about 100 to about 130% of the radius of the first catalyst conduit or half of $D_1$. In an embodiment, the distance between the longitudinal axis 128 and a lower edge of the arcuate section 94a corresponding to the side 192b of the projection 192 may be about 75 to about 100% of the of the radius of the first catalyst conduit or half of $D_1$. A same relationship may exist between the projection 194 and the longitudinal axis 190 of the second catalyst conduit 52 and the arcuate section 94b of the wall 94 of the insert 92.

The above relationships are most appropriate when the angle τ defined by the central longitudinal axis 128 of the first catalyst conduit and the central longitudinal axis 190 of the second catalyst conduit is 150 degrees. τ could take other angles.

When τ takes another angle the relationship between the arcuate sections 94a and 94b and the central longitudinal axes 128 and 190, respectively, can be described as follows with reference symbols only shown with respect to the second catalyst conduit 52, for example. The horizontal arc length $C_A$ of the arcuate section 94b of the wall 94 is about 1.0 to about 1.3 of the inner diameter of the nearest catalyst conduit which for example is $D_2$ for the second catalyst conduit 52. The horizontal arc length (not shown) of the arcuate section 94a of the wall 94 is also about 1.0 to about 1.3 of the inner diameter of the nearest catalyst conduit which for example is $D_1$ for the first catalyst conduit 12. The angle λ defined by the first pair 72 and the second pair 82 of openings between the first arcuate section 94a and the second arcuate section 94b of the insert 92 is about 50 to about 70 degrees. It is preferred that the first pair of openings 72 and the second pair of openings 82 define the same angle λ. The angle μ defined between the near edge of the second pair 82 of openings and the nearest central longitudinal axis 128, 190 is about 140 to about 160 degrees less half of τ. The angle σ defined between the nearest central longitudinal axis 128, 190 and the near edge of the first pair 72 of openings and is about half of τ less about 20 to about 40 degrees. The angle defined by the first arcuate section 94a and the second arcuate section 94b, which is the sum of μ and σ is between about 85 and 150 degrees, with about 110 to about 130 degrees being preferred. It is preferred that the first arcuate section 94a and the second arcuate section 94b have the same width and/or define the same angle.

The diameter $D_i$ of the insert 92 may be between 0.6 and 1.5 and preferably between 0.8 and 1.2 times the diameter of the largest one of the first regenerated catalyst conduit 12, $D_1$, and the second carbonized catalyst conduit 52, $D_2$.

In an aspect, the at least one pair 72, 82 of openings in the wall 94 of the insert 92 may serve as an exit from the chamber 74. Consequently, the first stream of regenerated catalyst and the second stream of carbonized catalyst may pass through the pair 72, 82 of openings from the chamber 74 back into the space 96. By virtue of the first and second catalyst streams passing around the insert 92 and entering into and exiting from the chamber 74 through the at least one of the first and second pair 72, 82 of openings in the wall 94 of the insert 92, the catalyst streams mix together to provide a mixed stream of catalyst with a more-homogeneous temperature throughout the mixed stream of catalyst.

Turning back to FIG. 1, the mixed stream of the first stream of catalyst and the second stream of catalyst passes from the insert 92 in the riser 10 upwardly from the lower section 11 and is contacted with the hydrocarbon feed injected from nozzles 18 in the upper section 17 of the riser 10.

EXAMPLE

We conducted Computational Fluid Dynamics modeling to determine the performance of different embodiments of the present invention. The first regenerated catalyst stream was devoid of coke, had a catalyst flow rate of 8,647,893 kg/h (19,065,343 lb/hr), a gas flow rate of 11,674 kg/hr (25,738 lb/hr) and a temperature of 742° C. (1,367° F.). The second carbonized catalyst stream was fully coked indicating a coke concentration of 0.858 wt-% of catalyst, also had a catalyst flow rate of 8,647,893 kg/h (19,065,343 lb/hr), a gas flow rate of 10,810 kg/hr (23,833 lb/hr) and a temperature of 549° C. (1,020° F.). The catalyst and gas properties in Table I were also utilized in the model.

TABLE I

| Property | Metric | English |
|---|---|---|
| Catalyst Density | 1442 kg/m³ | 90 lb/ft³ |
| Gas Density | 1.041 kg/m³ | 0.065 lb/ft³ |
| Gas Viscosity | 0.014 cP | |
| Gas Conductivity | 0.024 W/m-K | 0.014 Btu/h-ft-° F. |
| Catalyst Conductivity | 0.100 W/m-K | 0.58 Btu/h-ft-° F. |
| Gas Heat Capacity | 1004.83 J/kg-K | 0.24 Btu/lb-° F. |
| Catalyst Heat Capacity | 1151.370 J/kg-K | 0.275 Btu/lb-° F. |

The fluidizing steam rate was 74,174 kg/hr (163,525 lb/hr) from the single distributor 19. The steam temperature was 154° C. (310° F.). All of the modeling configurations had the horizontal angle τ between the regenerated catalyst conduit 12 and the carbonized catalyst conduit 52 of 150 degrees. Moreover, all of the modeling configurations corresponded to what is shown in the FIGS.

Based on these parameters, modeling indicated the embodiments of the invention would yield the temperature differentials as reported in Table II.

TABLE II

| Test No. | No. of Arcuate Sections | Angle of Two Wider Arcuate Sections (°) | Angle of Narrower Arcuate Section (°) | Paired Horizontally Aligned Openings | ΔT, ° C. (° F.) |
|---|---|---|---|---|---|
| 47 | 3 | 86 | 43 | No | 4 (8) |
| 48 | 2 | 120 | none | No | 8 (14) |
| 49 | 2 | 150 | none | No | 11 (20) |
| 50 | 2 | 120 | none | Yes | 6 (11) |

Table I shows the model of an insert with three arcuate sections had the lowest temperature differential. However, concern that the narrower arcuate section would unduly erode drove modeling of inserts with just two arcuate sections. Modeling of test 49 with two wider arcuate sections had a lower temperature differential than test 48 with two narrower arcuate sections. Both tests 48 and 49 performed worse than test 47 with three arcuate sections. However, test 50 with a band between horizontally aligned openings produced a lower temperature differential than without two horizontally aligned openings and closer to test 47 with three arcuate sections.

Preferred embodiments of this invention are described herein, including the best mode known to the inventors for carrying out the invention. It should be understood that the illustrated embodiments are exemplary only, and should not be taken as limiting the scope of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated. Pressures are given at the vessel outlet and particularly at the vapor outlet in vessels with multiple outlets.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for mixing two streams of catalyst in an FCC unit comprising:
    a riser;
    a first catalyst conduit in communication with the riser;
    a second catalyst conduit in communication with the riser, the second catalyst conduit being in downstream communication with the riser;
    an insert in said riser in communication with said first catalyst conduit;
    and
    a first pair of openings in a wall of said insert, openings in said first pair of openings being horizontally aligned.

2. The apparatus of claim 1 further comprising a band between said two openings.

3. The apparatus of claim 1 further comprising a space between said wall of said insert and a wall of said riser.

4. The apparatus of claim 1 wherein said pair of openings are not intersected by a central longitudinal axis of a nearest one of said first catalyst conduit and said second catalyst conduit into said riser.

5. The apparatus of claim 1 further comprising a second pair of openings in said insert, openings in said second pair of openings being horizontally aligned.

6. The apparatus of claim 5 wherein a first arcuate section and a second arcuate section of said wall of said insert define said first pair of openings and said second pair of openings.

7. The apparatus of claim 6 wherein one of said first arcuate section and said second arcuate section of said wall is intersected by a central longitudinal axis of a nearest one of said first catalyst conduit and said second catalyst conduit into said riser.

8. The apparatus of claim 6 wherein a projection of said first catalyst conduit extends into an opening in said first pair of openings on a first side but does not extend into an opening in said second pair of openings on a second side.

9. The apparatus of claim 8 wherein a projection of said second catalyst conduit extends into an opening in said first pair of openings on a first side but does not extend into an opening in said second pair of openings on a second side.

10. The apparatus of claim 6 wherein a horizontal arc length of one of said first arcuate section and said second arcuate section is about 1.0 to about 1.3 of the inner diameter of the nearest catalyst conduit.

11. The apparatus of claim 5 wherein a width of said first pair of openings is the same as a width of said second pair of openings.

12. The apparatus of claim 2 further comprising a bend in said second catalyst conduit and a bottom intersection of said second catalyst conduit with the riser at a second catalyst inlet is vertically aligned with the lower edge of the band.

13. The apparatus for mixing two streams of catalyst comprising:
    a riser;
    a first catalyst conduit in communication with the riser;
    a second catalyst conduit in communication with the riser;
    an insert in said riser in communication with said first catalyst conduit; and
    a first pair of openings in a wall of said insert, openings in said first pair of openings being horizontally aligned with one above the other and further comprising a first band between said two openings.

14. The apparatus of claim 13 wherein said two openings are not intersected by a central longitudinal axis of a nearest one of said first catalyst conduit and said second catalyst conduit into said riser.

15. The apparatus of claim 13 further comprising a second pair of openings in said insert, openings in said second pair of openings being horizontally aligned and further comprising a second band between said two openings wherein said first pair of openings and said second pair of openings define a first arcuate section and a second arcuate section of said wall of said insert between said first pair of openings and said second pair of openings.

16. The apparatus of claim 15 wherein one of said first arcuate section and said second arcuate section of said wall is intersected by a central longitudinal axis of a nearest one of said first catalyst conduit and said second catalyst conduit into said riser.

17. The apparatus of claim 13 wherein a projection of said first catalyst conduit extends into an opening in said first pair of openings on a first side but does not extend into an opening in said second pair of openings on a second side and a projection of said second catalyst conduit extends into an opening in said first pair of openings on a first side but does not extend into an opening in said second pair of openings on a second side.

18. An apparatus for mixing two streams of catalyst comprising:
    a riser;
    a first catalyst conduit in communication with said riser;
    a second catalyst conduit in communication with the riser;
    an insert in said riser in communication with said first catalyst conduit;
    a first pair of openings in a wall of said insert, openings in said first pair of openings being horizontally aligned with one above the other;
    a second pair of openings in wall of said insert, openings in said second pair of openings being horizontally aligned with one above the other; and
    a width of said first pair of openings being the same as a width of said second pair of openings.

19. The apparatus of claim 18 further comprising a first band between said two openings in said first pair of openings and a second band between said two openings in said second pair of openings.

20. The apparatus of claim 19 further comprising a bend in said second catalyst conduit and a lower edge of the first band is vertically aligned with a lowermost elevation of the second catalyst conduit.

* * * * *